United States Patent Office 3,231,568
Patented Jan. 25, 1966

3,231,568
PROCESSES AND INTERMEDIATES FOR
PREPARING 16α-METHYL CORTICOIDS
Percy L. Julian, Oak Park, and Joe M. Hill, Chicago, Ill., assignors, by mesne assignments, to Smith Kline & French Laboratories, Philadelphia, Pa., a corporation of Pennsylvania
No Drawing. Filed Feb. 26, 1964, Ser. No. 347,399
12 Claims. (Cl. 260—239.55)

This invention relates to new processes and intermediates for the preparation of 16α-methyl steroids having a pregnane nucleus. The end products prepared by this invention have utility as corticoid steroids and many are commercially available from example for treating arthritis, as anti-inflammatory agents, progestational agents, etc.

Reichstein's Compound S (cortexolone) is a well-known intermediate for preparing hydrocortisone and prednisolone by microbiological oxidation on a commercial scale. A commercially useful process for preparing Compound S is the subject of our copending application Serial No. 286,959, filed June 11, 1963. Prior to the development of this chemical process for preparing Compound S, 5-pregnene-3β,17α,21-triol-20-one 3,21-diacetate (diac) and 5-pregnene-3β,17α-21-triol-one 21-acetate (monac) and prior to the process and intermediates of this invention, 16α-methyl derivatives of Compound S, diac or monac were very expensive and not readily available on a commercial scale.

In our U.S. Patent No. 3,030,389 we disclosed a useful commercial method of preparing 16α-methyl cortisone or hydrocortisone as well as 16-methyl Compound S using a 5,6-dichloro protective group. The preparation of the starting material in that process, 5,6-dichloro-16-pregnen-3β-ol-20-one is achieved in only about 70% yield thereby losing a substantial amount of raw material at the outset of the process.

A substantial advantage of the present invention is that the major part of this overall process for preparing 16α-methyl corticoids is concerned with relatively inexpensive intermediates having a methylene group at $C_{11}$ rather than a hydroxymethylene or keto group. Perhaps more important is the fact that the method of this invention affords 16-methyl-17α-hydroxypregnenolones on a relatively inexpensive basis.

The nub of this invention is the protection of the A, B ring structure by a 6β-alkoxy-3,5-cyclo or i-system while the 16-methyl-17-hydroxy system is inserted. It is surprising that this protective system is stable under reaction conditions successful in forming the 16-methyl-17-hydroxy system. It will be apparent that 6-alkoxy groups other than methoxy can be used such as ethoxy or propoxy groups, however the cheapest and most commercially practical protective group is that derived from methanol, methoxy, in the β-configuration.

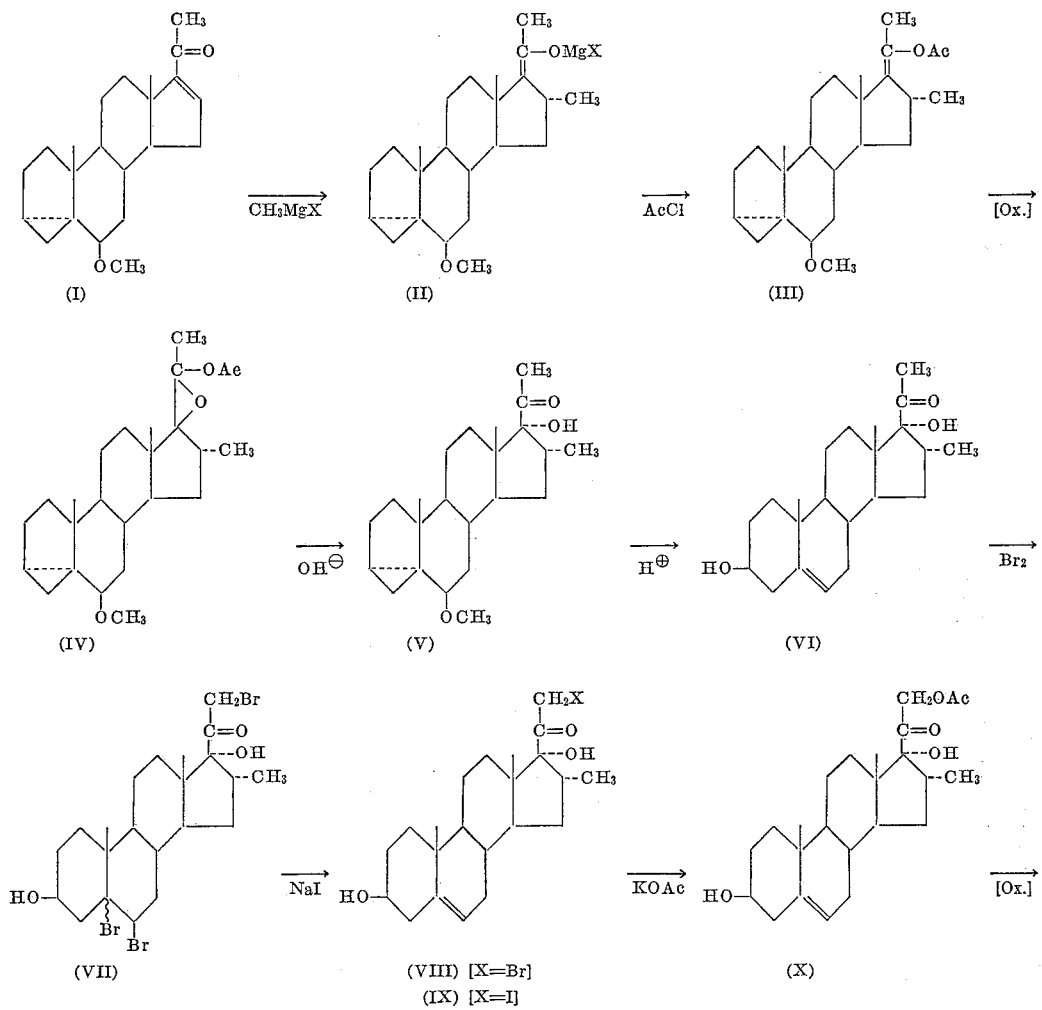

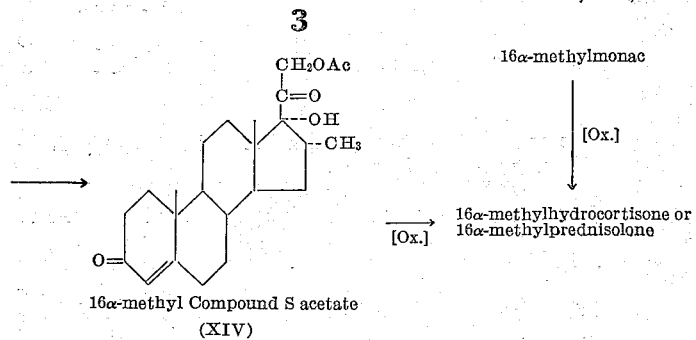

The starting material for the processes of this invention is the readily available 6-methoxy-3,5-cyclo-16-pregnen-20-one (I) [P. L. Julian et al., J. Am. Chem. Soc., 72, 368 (1950)]. The cyclopregnen (I) is reacted under standard Grignard conditions with a methyl magnesium halide such as the bromide, iodide or chloride to add the Grignard reagent 1,4 across the 20-keto-$\Delta^{16,17}$ system producing thereby the 16α-methyl-20-Grignard adduct (II). While the reaction conditions of this step can vary widely we have found it acceptable to run the reaction in the presence of cuprous chloride in the usual non-polar organic Grignard solvents such as benzene, ether, tetrahydrofuran or mixtures thereof at moderate temperatures, i.e., from about 0–50° C. Tetrahydrofuran or its mixtures with benzene are the preferred solvent systems. Alternatively other Grignard reagents or equivalent organo-metallic agents can be used, such as the ethyl or benzyl Grignards.

The Grignard adduct (II) is preferably not isolated but is used at once in the mother liquors for reaction with acetyl chloride under mild conditions such as in a suitable nonpolar organic solvent at temperatures around room temperature to form the acetyl derivative of the 17,20 enol (III). Other acyl halides or anhydrides can obviously be used such as those derived from carboxylic acids of a maximum of 10 carbons however acetyl chloride is the most feasible commercial acylating agent.

The enol acetate (III) is then oxidized at 17,20 to form the 17,20-epoxide. The reaction step is carried out with the usual oxidizing agents known to the art for forming oxido or epoxy derivatives especially the preferred per acids, such as per-acetic acid, per-phthalic or per-benzoic acid preferably in a buffered system. The reaction medium we have found most useful is sodium acetate-acetic acid in chloroform at temperatures of about room temperature or less. Per-acetic acid is the most suitable commercial oxidizing agent.

The 17,20-epoxide (IV) is then hydrolyzed under alkaline conditions to give 6-methoxy-16α-methyl - 17α-hydroxy-3,5-cyclopregnan-20-one (V) an important new intermediate. The hydrolysis is usually carried out using sodium hydroxide in aqueous methanolic or ethanolic solution at ambient temperature. Compounds II–V are novel, useful intermediates and are an important aspect of this invention.

The cyclopregnanolone (V) is rearranged under acid conditions such as with sulfuric acid in aqueous dioxane at reflux temperature to form 16α-methyl-3β,17 - dihydroxy-$\Delta^5$-pregnen-20-one (VI) [Batres et al., J. Org. Chem., 26, 871 (1961); British Patent No. 909,614]. Alternative acid conditions for this reaction are p-toluenesulfonic acid or sulfuric acid in dioxane or acetic acid. On using acid in acetic acid the 3-acetate is obtained which can be optionally hydrolyzed with alcoholic alkali under mild conditions as known to the art.

The 16α-methylpregnenolone (VI) is then tribrominated and converted to the 16α-methylmonac by the methods disclosed and claimed in our copending application Serial No. 286,959. Briefly VI is brominated with 3 molar equivalents of bromine in methylene chloride, pyridine and methanol at moderate temperatures (0–50° C.) The latter part of the bromination at C-21 is induced with hydrogen chloride gas. After cooling to about 10° C. alkali, such as sodium bicarbonate, is added to separate the tribromide, predominantly the 5α,6β-isomer, with cooling, usually about 0–5° C. The resulting product is therefore 5α,6β,21-tribromo-3,17-dihydroxy-16α - methyl-pregnan-20-one which reacts smoothly in the next step. Preferably the 5α,6β-dibromo intermediate (VII) is separated and used as the substantially pure crystalline product. The cis and 5β,6α-trans isomers may be isolated and recycled by debromination of the mother liquors to the pregnenolone starting material using chromous chloride (as in U.S. Patent No. 2,374,683) or zinc-acid.

The important 5α,6β,21-tribromo intermediate is then reacted with a slight excess over two molar equivalents of sodium or potassium iodide in acetone-methanol in the presence of an alkali metal salt such as potassium acetate at room temperature then at reflux to give the 5,6-dihydro compound then the desired 16α-methyl-3,17,21-trihydroxy-$\Delta^{5,6}$-pregnen-20-one 21-acetate (X, 16α - methylmonac, see Batres et al., above). Preferably the 21-halo-3β,17α-dihydroxy-16α-methyl-$\Delta^{5,6}$-pregnan - 20 - one (VIII and IX) which in practice is a mixture of the 21-iodo and 21-bromo congeners is reacted without isolation in the reaction mixture with the acetate reagent.

The reactions (I→X) are all high yield reactions carried out under simple conditions. The outlined intermediates may each be isolated if desired but for the highest yields on a commercial scale no isolation or purifications are necessary after I until V is isolated with the reactions through III taking place in the same kettle. Also reactions (III→X) take place in the same kettle without isolation.

Compound X (16α-methylmonac) is converted into 16α-methyl-4-pregnene-11α,17α,21-triol-3,20 - dione (16α-methylhydrocortisone) in several ways, for example by oxidation by chemical methods such as the Jones oxidation or by oxidative fermentation as per U.S. Patent No. 3,030,278 to 16α-methyl Compound S followed by stepwise fermentation of 16α-methyl Compound S to the hydrocortisone and prednisolone congeners or by direct fermentation of the 16α-methylmonac to these end products. Reference may be had to U.S. Patents No. 2,985,-563 and No. 3,030,278 or British Patent No. 909,614.

The oxidation of 16α-methylmonac (X) to 16α-methyl Compound S using the modified Jones oxidation was found to proceed in very high yields. Presumably this reaction goes favorably because of the protection of position 17 by the adjacent methyl substituent blocking this center from the troublesome D-homoannulation side reaction.

The 6-methoxy-3,5-cyclo system for protecting A, B configuration can also be used for preparing the 16β-methylmonac and Compound S congeners via the reaction of diazomethane on 6-methoxy-3,5-cyclo-16-pregnen-20-one to insert the 16β-methyl group followed by insertion of the 17α-hydroxy group by the classical Gallagher procedure.

The following examples are designed to illustrated this invention to those skilled in the art. Variations of this invention will be apparent to those reading this disclosure. Such variations may be in the reaction conditions or in the structures of the steroids themselves such as having inert substituents at nonreactive positions in the starting materials. Those variations obvious to those skilled in the art are considered within the ambit of this invention.

*Example 1*

A solution of 1 part of 3,5-cyclo-6-methoxy-16-pregnen-20-one in 7 parts of benzene is distilled to remove 2 parts then cooled. Five parts of tetrahydrofuran is mixed with 0.05 part of cuprous chloride with vigorous stirring to this mixture at 10° C. Methyl magnesium bromide (1.78 part) is added keeping the temperature at about 10–20° C. The steroid containing benzene solution is added at 10° C. keeping the temperature at 10–20° C. The reaction mixture is stirred for two hours at room temperature to give the Grignard adduct.

The reaction mixture containing the Grignard product is cooled to 10° C. and 0.41 part of freshly distilled acetyl chloride in 1 part benzene added to keep the temperature at 10–20° C. After stirring at room temperature for one hour a solution of 0.6 part of ammonium chloride in 6 parts of water is added with cooling. After stirring and filtering the mixture, the aqueous layer is separated, back extracting with benzene. The separated main solution is washed twice with saturated ammonium chloride solution. A trace of pyridine is added to the benzene extracts which are concentrated in vacuo to give a syrup residue, 3,5-cyclo-6-methoxy-16α-methyl-20-acetoxy-$\Delta^{17,20}$-pregnene. Methyl magnesium chloride or methyl magnesium iodide can be substituted for methyl magnesium bromide using equimolar amounts.

One part of the residue is dissolved in 9 parts of chloroform and mixed with 1.5 part of acetic acid at 5° C. The cooled solution is then reacted with a cooled mixture of 2 parts of 40% per-acetic acid and 0.4 part of anhydrous sodium acetate. The oxidation mixture is kept at less than 20° C. for three hours then for 14–16 hours (overnight) at room temperature with stirring. The mixture is poured into water. The product is taken into 4 parts of chloroform which is washed with sodium hydroxide solution and water to neutrality. The organic extracts are combined and concentrated in vacuo to a syrup, the 17,20-epoxide.

This compound is dissolved in 3.5 parts of methanol and stirred while 0.18 part of 76% sodium hydroxide flakes in water is added. After vigorous stirring a crystalline product separates. Water and acetic acid to slight acidity is added. Cooling and filtration gives 3,5-cyclo-6 - methoxy-16α-methyl - 17α - hydroxypregnan - 20 - one, M.P. 165–175° C. Recrystallized from chloroform-methanol, M.P. 188–190° C.

A suspension of 1 part of this cyclopregnanolone in 7 parts of dioxane is heated to about 85–90° C. to dissolve the compound. A mixture of 0.75 part water and 0.05 part sulfuric acid is added. The mixture is heated at reflux for about one hour while 2 parts distillate are removed. The reaction mixture is diluted with water, cooled and filtered. The separated product is washed with water, slurried in hot methanol and dried to give 16α - methyl - 3β,17α - dihydroxy - $\Delta^5$ - pregnen - 20 - one, M.P. 245–250° C.

A mixture of 1 part of the 16-methylpregnenolone, 7 parts of methylene chloride and 0.05 part of pyridine at about 8° C. is reacted with 0.5 part bromine in 0.5 part methylene chloride. After brief stirring the mixture is warmed to 35–38° C. when 0.2 part of methanol and some of 0.48 part of bromine is added. Hydrogen chloride gas is bubbled through the reaction mixture until bromination at $C_{21}$ starts then add the rest of the bromine. After brief stirring the mixture is cooled to about 10° C. when 0.365 part of sodium bicarbonate in 1 part of water is added cautiously. The tribromide separates while stirring at 0–5° C. for one hour and is separated by filtration and washed with water to give 5α,6β,21-tribromo-3,17-dihydroxy-16α-methyl-pregnan-20-one.

The separated 5α,6β-trans tribromide (1 part) in 4 parts acetone with 0.1 part potassium acetate is stirred while 0.76 part of sodium iodide is added then for one further hour at about room temperature. Acetone (6 parts), potassium acetate (1.6 parts) and 0.1 part of methanol are added. The reaction mixture is heated at reflux for three hours then concentrated to remove 6 parts solvent for reuse. Two parts of water are added and the distillation continued under vacuo to remove residual acetone. Adding water cooling and filtration gives 16α-methyl - 3,17,21 - trihydroxy-$\Delta^5$-pregnen-20-one 21-acetate (16-methylmonac acetate), M.P. 170–180° C. after slurrying. After purification by charcoal in acetone the melting point is 180–185° C.

*Example 2*

The 16α-methyl-17α-hydroxypregnenolone is recovered from the cis and 6β,5α-trans-dibromides of the bromination step of Example 1 as follows.

The methylene dichloride extracts and mother liquors from the bromination step of Example 1 are washed to neutrality, mixed with methanol and acetic acid with zinc dust at the boiling point. After stirring for 20–30 minutes the mixture is heated to reflux, allowed to settle and the supernatant liquid decanted. The solution is concentrated and cooled to give 16α-methyl-17α-hydroxypregnenolone which is rebrominated.

*Example 3*

One gram of 16-methylmonac is dissolved in pyridine and reacted with a molar equivalent amount of acetyl chloride at room temperature for several hours. The reaction mixture is quenched in water then extracted with methylene chloride. Washing and concentration of the extracts give 16α-methyldiac.

Hydrolysis of 16-methylmonac (1 g.) using sodium bicarbonate in methanol gives the free alcohol.

*Example 4*

20 kg. of 16α-methylmonac acetate from Example 1 in 80 l. of methylene chloride is cooled to 5° C. Pyridine (0.8 l.) is added followed by a solution of 9 kg. of bromine in 10 l. of methylene chloride. Acetone (240 l.) is added and the mixture is cooled to 0–5° C. A solution of 7.88 kg. of chromic acid, 8 l. of water and 6.77 l. of sulfuric acid is added holding the temperature below 23° C. Stirring is then continued briefly.

Methylene chloride (140 l.) and then 350 l. of water are added to the reaction mixture. The mixture is stirred and warmed to 30° C. The organic layer is separated, washed with water, diluted with 60 l. of methanol and 10 l. of acetic acid then debrominated with 6.5 kg. of zinc dust. The solvent is decanted from the zinc. At 30° C., 8 l. of concentrated hydrochloric acid is added. After stirring for thirty minutes, 350 l. of water is added. The methylene chloride layer is separated, washed with 10% caustic soda then with water to neutrality. The methylene chloride solution is evaporated to a very thick slurry, 140 l. of acetone is added and the mixture is concentrated. Cooling gives a high yield of 16α-methyl Compound S acetate, M.P. 98–103° C.

*Example 5*

A mixture of 5 g. of 3,5-cyclo-6β-methoxy-16α-methyl-17α-hydroxypregnan-20-one from Example 1 is dissolved in 75 ml. of aqueous dioxane with an excess of p-toluenesulfonic acid. The mixture is heated at reflux for three hours. Dilution with water separates the desired 16α-methyl-3β,17α-dihydroxy-$\Delta^5$-pregnan-20-one.

A mixture of 5 g. of 3,5-cyclo-6β-methoxy-16α-methyl-17α-hydroxypregnan-20-one is dissolved in acetic acid with an excess amount of sulfuric acid. The mixture is heated at reflux for a short period then cooled and quenched to separate the 3-acetyl derivative of the 16α-methyl-17α-hydroxypregnenolone. This material (1 g.) is heated at reflux briefly in aqueous methanolic sodium carbonate to give the desired 16α-methyl-17α-hydroxypregnenolone upon concentration and quenching in water. What is claimed is:

1. The method of preparing 16α-methyl-3β,17α,21-trihydroxy-Δ⁵-pregnen-20-one 21-acetate comprising reacting 3,5-cyclo-6β-methoxy-16-pregnen-20-one with methyl magnesium halide to form the 16α-methyl-20 Grignard adduct, reacting said adduct with acetyl chloride to form 20-acetoxy - 3,5-cyclo-6β-methoxy-16α-methyl-Δ¹⁷,²⁰-pregnene, reacting said 20-acetoxy-3,5-cyclo-6β-methoxy-16α-methyl-Δ¹⁷,²⁰-pregnene with per-acetic acid to form 20-acetoxy - 3,5-cyclo - 17,20 - epoxy - 6β - methoxy-16α-methylpregnane, hydrolyzing said 20-acetoxy-3,5-cyclo-17,20-epoxy-6β-methoxy-16α-methylpregnane under alkaline conditions to form 3,5 - cyclo - 17α - hydroxy - 6β-methoxy-16α-methylpregnan-20-one, rearranging said 3,5-cyclo-17α-hydroxy - 6β-methoxy - 16α-methylpregnan-20-one under acid conditions to form 17α-hydroxy-16α-methylpregnenolone, reacting said 17α-hydroxy-16α-methylpregnenolone with about two moles of bromine to form 3β,17α-dihydroxy-16α-methyl-5α,6β,21-tribromopregnan-20-one, reacting said 3β,17α-dihydroxy-16α-methyl-5α,6β,21-tribromopregnan-20-one with from about 2–3 moles of an alkali metal iodide to form 3β,17α-dihydroxy-21-halo-16α-methyl-Δ⁵,⁶-pregnen-20-one and reacting said 3β,17α-dihydroxy-21-halo-16α-methyl-Δ⁵,⁶-pregnen-20-one with an alkali metal acetate to form 16α-methyl - 3β,17α,21-trihydroxy-Δ⁵-pregnen-20-one 21-acetate.

2. The method of claim 1 characterized in that said 3β,17α - dihydroxy - 16α - methyl - 5α,6β,21 - tribromopregnan-20-one is separated in substantially pure form from the bromination reaction and used in the next step of the reaction.

3. The method of claim 1 characterized in that said 3β,17α - dihydroxy - 21 - halo - 16α - methyl-Δ⁵,⁶-pregnen-20-one is not isolated but is reacted in the reaction mixture substantially immediately with potassium acetate.

4. The method of preparing 16α-methyl-4-pregnen-17α,21-diol-3,20-dione 21-acetate comprising reacting 3,5-cyclo-6β-methoxy-16-pregnen-20-one with methyl magnesium halide to form the 16α-methyl-20 Grignard adduct, reacting said adduct with acetyl chloride to form 20-acetoxy-3,5-cyclo-6β-methoxy-16α-methyl-Δ¹⁷,²⁰-pregnene, reacting said 20-acetoxy-3,5-cyclo-6β-methoxy-16α-methyl-Δ¹⁷,²⁰-pregnene with per-acetic acid to form 20-acetoxy-3,5-cyclo-17,20-epoxy-6β-methoxy - 16α-methylpregnane, hydrolyzing said 20 - acetoxy-3,5-cyclo-17,20-epoxy-6β-methoxy-16α-methylpregnane under alkaline conditions to form 3,5-cyclo-17α-hydroxy-6β-methoxy-16α-methylpregnan-20-one, rearranging said 3,5-cyclo-17α-hydroxy-6β-methoxy-16α-methylpregnan-20-one under acid conditions to form 17α-hydroxy-16α-methylpregnenolone, reacting said 17α-hydroxy-16α-methylpregnenolone with about two moles of bromine to separate essentially crystalline 3β,17α-dihydroxy-16α-methyl - 5α,6β,21-tribromopregnan-20-one in the presence of sodium bicarbonate, reacting said 3β,17α-dihydroxy - 16α-methyl - 5α,6β,21-tribromopregnan-20-one with from about 2–3 moles of an alkali metal iodide to form 3β,17α-dihydroxy-21-halo-16α-methyl-Δ⁵,⁶-pregnen-20-one, reacting said 3β,17α-dihydroxy-21-halo-16α-methyl-Δ⁵,⁶-pregnen-20-one, reacting said 3β,17α-dihydroxy-21-halo-16α-methyl-Δ⁵,⁶-pregnen-20-one in its reaction mixture with potassium acetate to form 16α-methyl-3β,17α,21-trihydroxy-Δ⁵-pregnen-20-one 21-acetate and oxidizing said 16α-methyl-3β,17α,21-trihydroxy-Δ⁵-pregnen-20-one 21-acetate.

5. A compound having the formula:

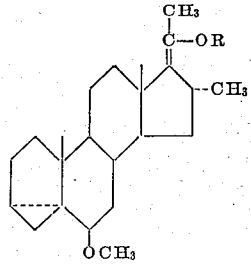

in which R is a member selected from the group consisting of acetyl, MgCl, MgBr and MgI.

6. 16α-methyl - 20-acetoxy-6-methoxy - 3,5-cyclo-Δ¹⁷,²⁰-pregnene.

7. 20-acetoxy - 3,5-cyclo - 17,20-epoxy-6-methoxy-16α-methylpregnane.

8. 3,5 - cyclo-6-methoxy - 16α - methyl - 17α - hydroxypregnan-20-one.

9. The method of preparing 17α-hydroxy-16α-methylpregnenolone comprising reacting 3,5-cyclo-6β-methoxy-16-pregnen-20-one with methyl magnesium halide to form the 16α-methyl-20-Grignard adduct, reacting said adduct with acetyl chloride to form 20-acetoxy-3,5-cyclo-6β-methoxy-16α-methyl-Δ¹⁷,²⁰-pregnene, reacting said 20-acetoxy-3,5-cyclo-6β-methoxy-16α-methyl-Δ¹⁷,²⁰-pregnene with per-acetic acid to form 20-acetoxy-3,5-cyclo-17,20-epoxy-6β-methoxy-16α-methylpregnane, hydrolyzing said 20-acetoxy-3,5-cyclo-17,20-epoxy-6β-methoxy-16αmethylpregnane under alkaline conditions to form 3,5-cyclo-17α-hydroxy-6β-methoxy-16α-methylpregnan-20-one and rearranging said 3,5-cyclo - 17α-hydroxy - 6β-methoxy-16α-methylpregnan-20-one under acid conditions.

10. The method of claim 9 characterized in that said 3,5-cyclo - 17α-hydroxy - 6β-methoxy - 16α-methylpregnan-20-one is rearranged under acid conditions in the presence of p-toluenesulfonic acid in aqueous dioxane.

11. The method of claim 9 characterized in that said 3,5-cyclo-17α-hydroxy - 6β-methoxy-16α-methylpregnan-20-one is rearranged using a member selected from the group consisting of sulfuric acid and p-toluenesulfonic acid in acetic acid to give the 3-acetate derivative of 16α-methyl-17α-hydroxypregnenolone and hydrolyzing said 3-acetate derivative with alcoholic alkali.

12. In the method of preparing 16-methyl-3β,17α-dihydroxy-20-keto-Δ⁵-6-pregnene, the modification comprising protecting the 3β-hydroxy-Δ⁵,⁶ system of the A, B ring of the pregnane nucleus by forming a 3,5-cyclo-6β-methoxy system.

References Cited by the Examiner

UNITED STATES PATENTS 3,085,090   4/1963   Graber et al. _____ 260—239.55

LEWIS GOTTS, *Primary Examiner.*